United States Patent [19]
Chibata et al.

[11] 3,816,254

[45] June 11, 1974

[54] OPTICAL RESOLUTION OF RACEMIC AMINO ACIDS

[75] Inventors: Ichiro Chibata, Suita; Tetsuya Tosa, Kyoto; Tadashi Sato, Takatsuki; Takao Mori, Suita, all of Japan

[73] Assignee: Tanabe Seiyake Co., Ltd., Osaka, Japan

[22] Filed: Dec. 14, 1972

[21] Appl. No.: 314,967

Related U.S. Application Data

[63] Continuation-in-part of Ser. No. 109,554, Jan. 25, 1971, abandoned.

[30] Foreign Application Priority Data

Feb. 3, 1970 Japan.................................. 45-9789

[52] U.S. Cl............... 195/29, 195/63, 195/DIG. 11, 195/2
[51] Int. Cl............................................ C12d 13/06
[58] Field of Search................ 195/29, DIG. 11, 63

[56] References Cited
UNITED STATES PATENTS
3,278,392   10/1966   Patchornik........................ 195/68 X
FOREIGN PATENTS OR APPLICATIONS
1,108,553   4/1968   Great Britain....................... 424/94
OTHER PUBLICATIONS
Silman et al., "Ann. Rev. Biochem.", 35 (II):882, (1966).

Primary Examiner—Alvin E. Tanenholtz
Attorney, Agent, or Firm—& Bierman Bierman

[57] ABSTRACT

Mold acylase is treated with a substantially water insoluble haloacetyl-polysaccharide. The resultant substantially water-insoluble mold acylase preparation is incubated with a solution of an alpha-N-acyl derivation of a racemic acid. Free L-amino acid forms.

17 Claims, No Drawings

OPTICAL RESOLUTION OF RACEMIC AMINO ACIDS

This is a continuation-in-part of copending application Ser. No. 109,554 filed Jan. 25, 1971 and now abandoned. The priority of Japanese application 9789/1970 filed Feb. 3, 1970 is claimed.

This invention relates to the optical resolution of racemic amino acids. More particularly, it relates to the asymmetric hydrolysis of alpha-N-acyl-DL-amino acid and recovery of the optically active constituents.

It is known that molds such as *Aspergillus oryzae* produce acylase. This mold acylase has the ability to hydrolyze the L-isomer of acylamino acid into the free amino acid. Further it is also known that the alpha-N-acyl-DL-amino acid can be asymmetrically hydrolyzed by conventional acylase whereby the said racemate is readily resolved into its optically active enantiomers. After the hydrolysis has been completed, the reaction solution is boiled and/or acidified to precipitate the enzyme, and the enzyme precipitate is filtered off. Thus, mold acylase can be used only once and must be discarded thereafter. The wasteful use of the acylase is obvious. In addition, the recovery of the amino acid produced necessarily requires the additional step of removing the enzyme and its contaminants from the product. Furthermore, mold acylase in an aqueous solution is sensitive to environmental factors. They tend to rapidly decrease its activity even when the enzyme reaction is carried out at the optimum temperature.

Some methods have been adapted to overcome the aforementioned disadvantages of the prior methods. For instance, U.S. Pat. No. 3,243,356, Canadian Pat. No. 659,059 and U.S. Pat. No. 3,386,888 have disclosed the resolution of DL-amino acid by hydrolyzing its N-acyl derivation asymmetrically with water-insoluble enzyme preparations. The water-insoluble polypeptidyl derivatives of mold acylase disclosed in U.S. Pat. No. 3,243,356 are prepared by the copolymerization of acylase with anhydrides of certain alpha-N-carboxy-amino acids. The enzyme preparation of said Canadian patent comprises kidney acylase embedded in an insoluble porous plastic. The method of U.S. Pat. No. 3,386,888 comprises introducing mold acylase into an anion exchange polysaccharide adsorbent to form a substantially insoluble complex and providing a solution of the N-acyl derivative of racemic amino acid to the acylase complex. The first and second methods (i.e., U.S. Pat. No. 3,243,356 and Canadian Pat. No. 659,059) are however, disadvantageous. The acylase preparations employed in said methods do not afford high enzymatic activity. The cross-linkage method of U.S. Pat. No. 3,243,356 and the entrapping method of Canadian Pat. No. 659,059 each require complicated procedures and vigorous reaction conditions which degenerate the enzyme and thereby cause a remarkable loss in enzyme activity. In the third method (i.e., U.S. Pat. No. 3,386,888) when the concentration of the substrate is adjusted to higher than about 0.3 M in order to speed up the preparation of optically active amino acid, the acylase tends to be liberated from the enzyme-adsorbent complex.

It is an object of the present invention to provide a novel water-insoluble mold acylase preparation which affords high enzymatic activity for a long period of time and which does not liberate acylase in the presence of a high concentration of substrate. It is another object of this invention to provide an improved method for resolving racemic amino acids by the use of acylase which method obviates the necessity for discarding the enzyme and allows reuse thereof in a number of successive operations. It is further object of this invention to provide a process which eliminates the necessity for additional steps to separate the desired product from the substances present in the reaction mixture, particularly from the enzyme itself, and in which optically active L-isomer is produced with high yields. Furthermore, other objects of this invention will be apparent from the following specification and claims.

According to the present invention, the optical resolution of a racemic amino acid can be performed by treating mold acylase with a water-insoluble haloacetyl-polysaccharide thereby preparing a water-insoluble mold acylase preparation, hydrolysing asymmetrically alpha-N-acyl-DL-amino acid with the water-insoluble preparation and separating the resultant free L-amino acid from the alpha-N-acyl-D-amino acid.

Bromoacetyl-cellulose, bromoacetyl-dextran, bromoacetyl-agarose, chloroacetyl-cellulose, chloroacetyl-dextran, chloroacetyl-agarose, iodoacetyl-cellulose, iodoacetyl-dextran and iodoacetyl-agarose are suitably employed as the water-insoluble haloacetyl-polysaccharide of the present invention. These polysaccharide derivatives may be prepared in accordance with the method described in U.S. Pat. No. 3,278,392. For instance, a mixture of cellulose powder, bromoacetic acid and dioxane is stirred at 20° to 30° C for 16 to 24 hours. Bromoacetyl-bromide is added to the mixture. After stirring for 6 to 8 hours, the resultant mixture is poured into ice-water and the precipitates formed are washed and dried. Pure bromoacetyl-cellulose powder is obtained. The other bromoacetyl-polysaccharides and chloroacetyl-polysaccharides are obtained in the same manner as above. The content of chlorine or bromine in the polysaccharide derivatives can be readily controlled by adjusting the amount of haloacetyl-halide employed in the above reaction. Alternatively, the iodoacetyl-polysaccharide may be prepared by adding said bromoacetyl- or chloroacetyl-polysaccharide to a 95 percent alkanol solution of sodium iodide, then agitating the resultant mixture at room temperature overnight. The haloacetyl-polysaccharide employed for the purpose of this invention contains 4 to 40 w/w percent of halogen atom. Preferably it contains about 8 w/w percent of chlorine, about 18 w/w percent of bromine or about 31 w/w percent of iodine.

The water-insoluble acylase preparation which is employed for this invention can be prepared by contacting one of said haloacetyl-polysaccharides with mold acylase in the presence of a salting out agent of protein. Inorganic sulfate such as ammonium sulfate and sodium sulfate are suitably employed as the salting out agent. The amount of the salting out agent which is added to the reaction mixture should be within the range of 0.6 to 3.6 millimoles, preferably within the range of 1.0 to 3.2 millimoles, per ml of the reaction mixture. When a haloacetyl-polysaccharide containing the above-mentioned concentration of halogen is employed, the preferable amount of mold acylase to be introduced into said polysaccharide is about 0.1 to 0.25 g per g of haloacetyl-polysaccharide. The resulting water-insoluble acylase preparation is collected by filtration or centrifugation, and, if required, the preparation may be further purified by washing with physiological saline solution. As the source of acylase, enzyme preparations containing acylase obtained from microorganisms such as *Aspergillus oryzae, Aspergillus meleus, Aspergillus midulans, Penicillium vinaceum* or *Penicillium corymbiferum* are preferred. They may be dissolved in water then used in preparing the water-insoluble enzyme preparation of the above-mentioned procedures. The aqueous solution containing acylase may be directly prepared by cultivating one of said microorganisms in an aqueous medium then filtering the resulting culture. The solution may also be prepared by inoculating one of said microorganisms on a previously autoclaved wheat bran-hull medium, incubating the mixture under suitable conditions and extracting the resulting culture with water. Alternatively, an acylase solution containing various impurities such as proteinic impurities and coloring materials may be employed. Such impurities can be readily removed from the water-insoluble enzyme preparation by subsequent washing with water.

Many N-acyl derivatives of racemic amino acids may be employed in the present invention as the substrate or starting material. Examples of said N-acyl amino acids are; alpha-N-acetyl- amino acids such as N-acetyl-alanine, N-acetyl-valine, N-acetyl-leucine, N-acetyl-isoleucine, N-acetyl-serine, N-acetyl-threonine, N-acetyl-cysteine, N-acetyl-methionine, N-acetyl-phenylalanine, N-acetyl-tyrosine, N-acetyl-aspartic acid, N-acetyl-glutamic acid, N-acetyl-histidine, alpha-N-epsilon-N-diacetyllysine, alpha-N-delta-N-diacetyl-ornitine and alpha-N-acetyl-epsilon-N-benzoyl-lysine. Other acyl derivatives, such as N-formyl, N-chloroacetyl-, N-bromoacetyl-, N-propionyl-, N-butyryl- or N-benzoyl derivatives of alpha-amino acid may also be used.

The concentration of substrate employed is not critical for the purpose of the present invention. In a preferred embodiment of this invention, however, the racemate of an alpha-N-acyl-amino acid is dissolved in water at a concentration of 0.2 mol/liter to 1.0 mol/liter. The solution is then adjusted to a pH of 5.0 to 9.0. The aforementioned water-insoluble enzyme preparation is added to the solution, and the mixture is incubated at a temperature of 30° to 60° C, with stirring, for a sufficient length of time to complete the reaction. It is advantageous to add a small amount of cobalt (II) ion into the substrate solution as an activator. After the reaction is completed, the mixture is filtered or centrifuged to recover the insoluble enzyme for subsequent use. The L-isomer which is in the form of the free amino acid may be recovered from the filtrate or supernatant liquid. Alternatively, the enzymatic hydrolysis of this invention may be performed by a column method which makes it possible to carry out the hydrolysis in a successive manner. For instance, the water-insoluble acylase preparation is charged into a column and an aqueous solution (pH 5.0 to 9.0) of alpha-N-acyl-DL-amino acid is passed through the column at a suitable flow rate, whereby an aqueous solution containing L-amino acid and alpha-N-acyl-D-amino acid are obtained as the effluent. From the effluent, the portion of the amino acid which is in the free form and the portion which is in the acylated form are separated from each other by means of the difference of their solubilities in water or in organic solvent. In any case, the water-insoluble acylase preparation of the invention retains a high level of enzymatic activity during the reaction even in the presence of a high concentration of substrate, as for example a solution containing 0.3 to 1.0 mol/liter of substrate. Moreover, due to the sufficient durability of the enzymatic activity of the enzyme preparation of the invention, repeated use of the acylase preparation is possible.

In the examples which follow, the activity of each of the enzyme preparations is shown by the term "unit" which is defined in the "Report of the Commission on Enzymes of the International Union of Biochemistry (1961)." "Unit" represents the number of micromoles of substrate hydrolyzed by the action of the enzyme in one minute, as measured by any one of the following methods:

Free enzyme:
The substrate solution comprises;
| | |
|---|---|
| 0.2 M solution of N-acetyl-DL-methionine (pH 7.0) | 0.5 ml. |
| 1.5 × $10^{-3}$ M solution of $CoCl_2$ | 0.5 ml. |
| 0.1 M phosphate buffer solution (pH 7.0) | 1.0 ml. |

To this solution, 1.0 ml of the acylase solution is added and the mixture is incubated for 30 minutes at 37°C. The quantity of L-methionine liberated is colorimetrically assayed by the ninhydrin method.

Insoluble enzyme:
The substrate solution contains acetyl-methionine at a concentration of 0.2 M and $CoCl_2$ at a concentration of 5 × $10^{-4}$ M (pH 7.0). The substrate solution is passed through a column packed with the insoluble enzyme at a space velocity of 5 at 37°C. L-Methionine in the effluent is assayed by the same manner as described above.

Practically and presently preferred embodiments of this invention are illustratively shown in the following Examples.

Example 1

A solid culture prepared by the cultivation of *Aspergilus oryzae* on wheat bran-hull medium is extracted with 10 times its volume of water under stirring for 2 hours. Ammonium sulfate is gradually added to the extract until the ammonium sulfate concentration reaches a level of 0.3 saturation in the extract, and the resultant precipitates are removed by centrifugation. Then, ammonium sulfate is added to the supernatant liquid until its concentration in the solution reaches 0.5 of saturation. The precipitates thus obtained are collected by centrifugation and dissolved in water. The solution is dialyzed against running water and then lyophilized. The acylase activity of the lyophilized enzyme is 4 units/mg.

100 mg of the enzyme are dissolved in 50 ml of 0.2 M-phosphate buffer solution (pH 8.5). 10 g of ammonium sulfate and 1 g of bromoacetyl-cellulose containing 18.1 percent bromine by weight are added to the solution. The mixture is stirred for 24 hours at 7°C and the insoluble materials are collected by filtration, 2.5 ml of a water-insoluble enzyme preparation are obtained. Acylase activity: 48 units/ml.

A mixture of 2.5 ml of the enzyme preparation and 2.5 ml of cellulose powder is charged into a 1 × 6.3 cm. column. An aqueous solution (pH 7.0) containing 0.2 M concentration of N-acetyl-DL-methionine and 5 ×

$10^{-4}$ M concentration of cobalt ion is continuously passed through the column at 37°C at flow rates of 40 ml/hr and of 20 ml/hr. The concentration of L-methionine in the effluent is colorimetrically assayed by the ninhydrin method from samples obtained at intervals, and the conversion rate of N-acetyl-DL-methionine to L-methionine is calculated therefrom. The results obtained are shown in Table I.

Table I

Conversion rates of N-acetyl-DL-methionine to L-methionine (%)

| Operation time (hrs.) | Flow rate 40 ml/hr. | 20 ml/hr. |
|---|---|---|
| 2 | 68.3 | 100 |
| 21 | 68.6 | 100 |
| 48 | 68.3 | 100 |
| 75 | 68.5 | 100 |
| 96 | 68.6 | 100 |
| 120 | 68.5 | 100 |

Example 2

100 mg of the same purified enzyme as employed in Example 1 are dissolved in 50 ml of 0.2 M-phosphate buffer solution (pH 8.5). 10 g of ammonium sulfate and 1 g of chloroacetyl-cellulose containing 8 percent chlorine by weight are added to the solution. Then, the mixture is treated in the same manner as in Example 1, whereby 2.5 ml of a water-insoluble enzyme preparation having an acylase activity of 25 units/ml are obtained.

A mixture of 2.5 ml of the enzyme preparation and 2.5 ml of cellulose powder is charged into a 1 × 6.3 cm. column. An aqueous solution (pH 7.0) containing 0.2M concentration of N-acetyl-DL-methionine and 5 × $10^{-4}$ M concentration of cobalt ion is continuously passed through the column at 37°C at flow rates of 25 ml/hr. and of 12.5 ml/hr. The concentration of L-methionine in the effluent is assayed from samples obtained at intervals, and the conversion rate of N-acetyl-DL-methionine to L-methionine is calculated therefrom. The results obtained are shown in Table II.

Table II

Conversion rates of N-acetyl-DL-methionine to L-methionine (%)

| Operation time (hrs.) | Flow Rate 25 ml/hr. | 12.5 ml/hr |
|---|---|---|
| 2 | 69.1 | 100 |
| 21 | 69.3 | 100 |
| 48 | 68.9 | 100 |
| 75 | 69.0 | 100 |
| 96 | 69.3 | 100 |
| 120 | 68.8 | 100 |

Example 3

100 mg of the same purified enzyme as employed in Example 1 are dissolved in 50 ml of 0.2 M-phosphate buffer solution (pH 8.5). 10 g of ammonium sulfate and 1 g of iodoacetyl-cellulose containing 30.6 percent iodine by weight are added to the solution. Then, the mixture is treated in the same manner as in Example 1, whereby 2.5 ml of a water-insoluble enzyme preparation having an acylase activity of 80 units/ml are obtained.

A mixture of 2.5 ml of the enzyme preparation and 2.5 ml of cellulose powder is charged into a 1 × 6.3 cm. column. An aqueous solution (pH 7.0) containing 0.2 M concentration of N-acetyl-DL-methionine and 5 × $10^{-4}$ M concentration of cobalt ion is continuously passed through the column at 37°C at flow rates of 40 ml/hr. and of 20 ml/hr. The concentration of L-methionine in the effluent is assayed from samples obtained at intervals, and the conversion rate of N-acetyl-DL-methionine to L-methionine is calculated therefrom. The results obtained are shown in Table III.

Table III

Conversion rates of N-acetyl-DL-methionine to L-methionine (%)

| Operation time (hrs.) | Flow Rate 40 ml/hr. | 20 ml/hr. |
|---|---|---|
| 2 | 67.6 | 100 |
| 21 | 67.7 | 100 |
| 48 | 67.3 | 100 |
| 75 | 67.8 | 100 |
| 96 | 67.4 | 100 |
| 120 | 67.7 | 100 |

Example 4

A mixture of 0.5 ml of the same enzyme preparation as employed in Example 1 and 4.5 ml of cellulose powder is charged into a 1 × 6.3 cm. column. An aqueous solution (pH 7.0) containing N-acetyl-methionine and 5 × $10^{-4}$ M concentration of cobalt ion is passed through the column at 37°C or 52°C at a flow rate of 25 ml/hr. and of 12.5 ml/hr. The conversion rate to L-methionine in each case is calculated. The results obtained are shown in Table IV.

Alternatively, the above procedure is repeated with the exception that the same enzyme preparation as employed in Examples 2 or 3 is used instead of the above-mentioned preparation, and the results obtained in each of these cases are shown in Tables V and VI. (Table V represents the results obtained by using the enzyme preparation in Example 2, and Table VI represents the results obtained by using the enzyme preparation in Example 3.)

Table IV

| Concentration of N-acetyl-DL-methionine (mol./l.) | Flow rate (ml/hr) | Temperature (°C) | Conversion rate to L-methionine (%) |
|---|---|---|---|
| 0.2 | 25 | 37 | 36.6 |
| 0.2 | 25 | 52 | 61.5 |
| 0.5 | 12.5 | 37 | 31.5 |
| 0.5 | 12.5 | 52 | 59.4 |

TABLE V

| Concentration of N-acetyl-DL-methionine (mol./l.) | Flow rate (ml/hr) | Temperature (°C) | Conversion rate to L-methionine (%) |
|---|---|---|---|
| 0.2 | 25 | 37 | 19.3 |
| 0.2 | 25 | 52 | 31.5 |
| 0.5 | 12.5 | 37 | 16.9 |
| 0.5 | 12.5 | 52 | 30.2 |

Table VI

| Concentration of N-acetyl-DL-methionine (mol./l.) | Flow rate (ml/hr) | Temperature (°C) | Conversion rate to L-methionine (%) |
|---|---|---|---|
| 0.2 | 25 | 37 | 75.2 |
| 0.2 | 25 | 52 | 100 |
| 0.5 | 12.5 | 37 | 68.4 |
| 0.5 | 12.5 | 52 | 100 |

Example 5

An aqueous solution containing N-acetyl-DL-amino acid and $5 \times 10^{-4}$ M concentration of cobalt ion is adjusted to pH 7.0. The solution is passed through the same column as employed in Example 1 at 37°C at a flow rate as shown in Table VII. The conversion rate of N-acetyl-DL-amino acid to L-amino acid is calculated by the same manner as described in the foregoing examples. The results obtained are shown in Table VII.

Alternatively, the above procedure is repeated with the exception that the same column as employed in Example 2 or 3 is used instead of the above-mentioned column, and the results obtained in each of these cases are shown in Tables VIII and IX. (Table VIII represents the results obtained by using the column in Example 2 and Table IX represents the results obtained by using the column in Example 3).

Table VII

| N-acetyl-DL-amino acid | Concentration (mol./l) | Conversion rates to L-amino acid (%) | | | |
|---|---|---|---|---|---|
| | | L-amino acid formed | Flow rate (ml/hr) | | |
| | | | 40 | 20 | 12.5 |
| N-acetyl-DL-methionine | 0.2 | L-methionine | 68.8 | 100 | — |
| N-acetyl-DL-methionine | 0.5 | L-methionine | 52.5 | 89.8 | 100 |
| N-acetyl-DL-valine | 0.2 | L-valine | 53.5 | 87.2 | 100 |
| N-acetyl-DL-phenylalanine | 0.2 | L-phenylalanine | 68.5 | 100 | — |
| N-acetyl-DL-tryptophan | 0.2 | L-tryptophan | 56.8 | 93.0 | 100 |

Table VIII

| N-acetyl-DL-amino acid | Concentration (mol./l.) | Conversion rates to L-amino acid (%) | | | |
|---|---|---|---|---|---|
| | | L-amino acid formed | Flow rate (ml/hr.) | | |
| | | | 20 | 10 | 5 |
| N-acetyl-DL-methionine | 0.2 | L-methionine | 69.2 | 100 | — |
| N-acetyl-DL-methionine | 0.5 | L-methionine | 53.6 | 89.9 | 100 |
| N-acetyl-DL-valine | 0.2 | L-valine | 56.7 | 91.2 | 100 |
| N-acetyl-DL-phenylalanine | 0.2 | L-phenylalanine | 69.4 | 100 | |
| N-acetyl-DL-tryptophan | 0.2 | L-tryptophan | 60.4 | 98.4 | 100 |

Table IX

| N-acetyl-DL-amino acid | Concentration (mol./l.) | Conversion rates to L-amino acid (%) | | | |
|---|---|---|---|---|---|
| | | L-amino acid formed | Flow rate (ml/hr) | | |
| | | | 80 | 40 | 20 |
| N-acetyl-DL-methionine | 0.2 | L-methionine | 68.7 | 100 | — |
| N-acetyl-DL-methionine | 0.5 | L-methionine | 50.4 | 67.9 | 100 |
| N-acetyl-DL-valine | 0.2 | L-valine | 59.7 | 89.4 | 100 |
| N-acetyl-DL-phenylalanine | 0.2 | L-phenylalanine | 68.4 | 100 | — |
| N-acetyl-DL-tryptophan | 0.2 | L-tryptophan | 60.7 | 98.3 | 100 |

Example 6

114.7 g of N-acetyl-DL-methionine are dissolved in 300 ml of 2N sodium hydroxide. 357 mg of cobalt chloride hexahydrate are added to the solution and the solution is diluted with water to a total volume of 3 liters. The solution is passed through the same column as employed in Example 1 at a flow rate of 20 ml/hr at 37°C. The effluent is concentrated under reduced pressure to about one-fifth of its original volume, whereby the major part of the L-methionine is crystallized out. The crystals are collected by filtration and the filtrate is evaporated to dryness. 50 ml of ethanol are added to the residue and the remaining crystals (L-methionine) are collected by filtration. Both crystals are combined and recrystallized from aqueous ethanol, whereby 40.8 g of L-methionine are obtained.

$[\alpha]\ D^{25} = +23.4°$ ($C = 3$, in 1H-HCl)

The ethanol fraction is evaporated to dryness. The residue thus obtained is dissolved in 100 ml of water. The aqueous solution is passed through a column of strong acidic cation exchange resin and then the column is washed with water. The effluent and washings are combined and concentrated to dryness. The residue is recrystallized from water, whereby 50.6 g of N-acetyl-D-methionine are obtained. Mp 103°–104°C.

$[\alpha]\ D^{25} = -19.6°$ ($C = 3$, in water).

9.6 g of this compound are refluxed in 85 ml of 2N-hydrochloric acid for 2 hours. The reaction mixture is evaporated to dryness. The residue is adjusted to pH 5.5 with 2N sodium hydroxide and recrystallized from aqueous ethanol, whereby 5.3 g of D-methionine are obtained.

$[\alpha]\ D^{25} = -23.4°$ ($C = 3$, in 1N-HCl)

Example 7

82.9 g of N-acetyl-DL-phenylalanine are dissolved in 200 ml of 2N sodium hydroxide. 238 mg of cobalt chloride hexahydrate are added to the solution and the solution is diluted with water to a total volume of 2 liters. The solution is passed through the same column as employed in Example 1 at a flow rate of 15 ml/hr at 37°C. The effluent is concentrated under reduced pressure into about one-fifth of its original volume. The precipitated crystals are collected by filtration and the filtrate is evaporated to dryness. 40 ml of ethanol are added to the residue and the remaining crystals (L-phenylalanine) are collected by filtration. Both crystals are combined and recrystallized from water, whereby 29.6 g of L-phenylalanine are obtained.

$[\alpha]\ D^{27} = -34.4°$ ($C = 1$, in water).

The ethanol fraction is evaporated to dryness and the residue is crystallized from dilute hydrochloric acid. The precipitated crystals are recrystallized from water, whereby 37.4g of N-acetyl-D-phenylalanine are obtained. M.p. 170°C.

$[\alpha]\ D^{27} = -50.5°$ ($C = 1$, in absolute ethanol).

10.4 g of this compound are refluxed in 85 ml of 2N hydrochloric acid for 2 hours. The reaction mixture is evaporated to dryness. The residue is adjusted to pH 5.5 with 2N sodium hydroxide and recrystallized from aqueous ethanol, whereby 6.4 g of D-phenylalanine are obtained.

$[\alpha]\ D^{27} = +34.9°$
($C = 1$, in water).

Example 8

8.29g of N-acetyl-DL-phenylalanine are dissolved in 20 ml of 2N sodium hydroxide. 24 mg of cobalt chloride hexahydrate are added to the solution and the solution is diluted with water to a total volume of 200 ml. 2.5 ml of the same enzyme preparation as employed in Example 1 are added to the solution. The mixture is incubated at 37°C for 24 hours with stirring. Then, the mixture is treated in the same manner as in Example 5, whereby, 2.72 g of L-phenylalanine and 3.52 g of N-acetyl-D-phenylalanine are obtained. In the course of the reaction the conversion rate to L-phenylalanine is measured.

Alternatively, the above procedure is repeated with the exception that the same enzyme preparation as employed in Example 2 or 3 is used, and in each of these cases the conversion rate to L-phenylalanine is measured in the course of the reaction. The results obtained are shown in Table X.

Table X

| Enzyme Preparation | Conversion rates to L-phenylalanine (%) |||||||| 
|---|---|---|---|---|---|---|---|---|
| | Incubation time (hr.) ||||||||
| | 2 | 4 | 7 | 8 | 12 | 14 | 24 | 48 |
| The preparation employed in Example 1. | — | 40.5 | 61.8 | — | — | — | 100 | — |
| The preparation employed in Example 2 | — | — | — | 42.5 | — | 70.2 | — | 100 |
| The preparation employed in Example 3 | 39.4 | 64.5 | — | — | 100 | — | — | — |

What is claimed is:

1. A method of resolving a racemic amino acid into an optically active component which comprises contacting mold acylase with a substantially water-insoluble haloacetyl-polysaccharide, in the presence of an agent which salts out protein, said agent being employed in an amount of 0.6 to 3.6 millimols per ml. of reaction mixture, to produce a substantially water-insoluble mold acylase preparation, incubating a solution of an alpha-N-acyl-derivative of the racemic amino acid in the presence of said acylase preparation to form free L-amino acid in the solution.

2. The method according to claim 1 characterized in that said agent is an inorganic sulfate.

3. The method according to claim 1 characterized in that said agent is ammonium sulfate or sodium sulfate.

4. The method according to claim 1 characterized in that said agent is employed in an amount of 1.0 to 3.2 millimoles per ml of reaction mixture.

5. A method of resolving a racemic amino acid into an optically active component which comprises contacting mold acylase with a substantially water-insoluble haloacetyl-polysaccharide in the presence of 0.6 to 3.6 millimoles per ml of reaction mixture of an agent which salts out protein, to produce a substantially water-insoluble mold acylase preparation, continuously flowing an aqueous solution of an alpha-N-acyl derivative of the racemic amino acid through a column of said preparation to produce an effluent containing free L-amino acid and alpha-N-acyl-D-amino acid, and separating the L-amino acid from the alpha-N-acyl-D-amino acid.

6. The method according to claim 1 characterized in that said haloacetyl-polysaccharide is selected from the group consisting of bromoacetyl-cellulose, bromoacetyl-dextran, bromoacetyl-agarose, chloroacetyl-cellulose, chloroacetyl-dextran, chloroacetyl-agarose, iodoacetyl-cellulose, iodoacetyl-dextran and iodoacetyl-agarose.

7. The method according to claim 1 characterized in that said mold acylase is selected from the group consisting of acylases produced by *Aspergillus oryzae, Penicillium vinaceum, Aspergillus meleus, Aspergillus midulans* and *Penicillium corymbiferum*.

8. The method according to claim 1 characterized in that said haloacetyl-polysaccharide contains about 4 to 40 w/w percent of halogen atom.

9. The method according to claim 8 characterized in that said haloacetyl-polysaccharide contains about 8 w/w percent chlorine or about 18 w/w percent bromine or about 31 w/w percent iodine.

10. The method according to claim 8 characterized in that 0.1 to 0.25 g of said mold acylase are present per gram of said haloacetyl-polysaccharide.

11. The method according to claim 1 characterized in that said solution of the alpha-N-acyl derivative of the racemic amino acid is an aqueous solution and the concentration of the racemate therein is 0.2 – 1.0 mol/liter.

12. A substantially water-insoluble mold acylase preparation comprising mold acylase covalently bonded to a substantially water-insoluble haloacetyl-polysaccharide, said water-insoluble acylase being prepared by contacting mold acylase with a substantially water-insoluble haloacetyl-polysaccharide, in the presence of an agent which salts out protein, said agent being employed in an amount of 0.6 to 3.6 millimols per ml., thereby producing said water-insoluble mold acylase.

13. The preparation as claimed in claim 12, wherein said haloacetyl-polysaccharide is selected from the group consisting of bromoacetyl-cellulose, bromoacetyl-dextran, bromoacetyl-agarose, chloroacetyl-cellulose, chloroacetyl-dextran, chloroacetyl-agarose, iodoacetyl-cellulose, iodoacetyl-dextran and iodoacetyl-agarose.

14. The preparation as claimed in claim 12, wherein said mold acylase is selected from the group consisting of acylases produced by *Aspergillus oryzae, Penicillium vinaceum, Aspergillus meleus, Aspergillus midulans* and *Penicillium corymbiferum*.

15. The preparation as claimed in claim 12, wherein said haloacetyl-polysaccharide contains about 4 to 40 w/w percent of halogen atom.

16. The preparation as claimed in claim 15, wherein said haloacetyl-polysaccharide contains about 8 w/w percent chlorine, about 18 w/w percent bromine or about 31 w/w percent iodine.

17. The preparation as claimed in claim 12, wherein 0.1 to 0.25 g of said mold acylase are bonded per gram of said haloacetyl-polysaccharide.

* * * * *